United States Patent
Huang et al.

(10) Patent No.: US 11,558,884 B2
(45) Date of Patent: Jan. 17, 2023

(54) SYSTEMS AND METHODS FOR UPLINK TRANSMISSION OVERLAP RESOLUTION

(71) Applicant: QUALCOMM Incorporated, San Diego, CA (US)

(72) Inventors: Yi Huang, San Diego, CA (US); Hwan Joon Kwon, San Diego, CA (US); Peter Gaal, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 17/171,842

(22) Filed: Feb. 9, 2021

(65) Prior Publication Data
US 2021/0258992 A1    Aug. 19, 2021

Related U.S. Application Data

(60) Provisional application No. 62/976,819, filed on Feb. 14, 2020.

(51) Int. Cl.
*H04W 72/12* (2009.01)
*H04L 5/00* (2006.01)

(52) U.S. Cl.
CPC ....... *H04W 72/1268* (2013.01); *H04L 5/0055* (2013.01); *H04W 72/1247* (2013.01); *H04W 72/1284* (2013.01)

(58) Field of Classification Search
CPC ......... H04W 72/1268; H04W 72/1247; H04W 72/1284; H04W 72/1242; H04L 5/0055;
(Continued)

(56) References Cited

U.S. PATENT DOCUMENTS

2018/0006771 A1*  1/2018  Huss ................ H04L 1/0003
2019/0313419 A1   10/2019  Fakoorian et al.
(Continued)

FOREIGN PATENT DOCUMENTS

EP      3471322 A1    4/2019
WO   WO-2018208087 A1 * 11/2018 ............. H04L 5/001

OTHER PUBLICATIONS

International Search Report and Written Opinion—PCT/US2021/017457—ISA/EPO—dated May 14, 2021.
(Continued)

*Primary Examiner* — Sharmin Chowdhury
(74) *Attorney, Agent, or Firm* — Norton Rose Fulbright US LLP

(57) ABSTRACT

This disclosure provides systems, methods, and devices for wireless communication that support resolution of uplink (UL) transmission overlap of communication types having different priorities. In some implementations, a method of wireless communication includes determining, at a user equipment (UE), that a first scheduled UL transmission corresponding to a first communication type having a first priority overlaps with a second scheduled UL transmission corresponding to a second communication type having a second priority. The first priority is higher than the second priority. The method also includes multiplexing at least a portion of the first scheduled UL transmission with at least a portion of the second scheduled UL transmission to generate a third UL transmission. The method further includes transmitting, from the UE to a base station, the third UL transmission. Other aspects and features are also claimed and described.

22 Claims, 9 Drawing Sheets

(58) Field of Classification Search
CPC .............. H04L 5/0057; H04L 5/0064; H04L 1/0031; H04L 1/16; H04L 5/0051; H04L 1/0027; H04L 1/0013; H04L 1/0073; H04L 5/0007; H04B 7/0404; H04B 7/0413

See application file for complete search history.

(56) References Cited

U.S. PATENT DOCUMENTS

| | | | |
|---|---|---|---|
| 2021/0022165 A1* | 1/2021 | Sun ................. | H04L 5/0053 |
| 2021/0058922 A1* | 2/2021 | Han ................. | H04L 5/0055 |
| 2022/0116156 A1* | 4/2022 | Takeda ............ | H04L 1/1854 |
| 2022/0217760 A1* | 7/2022 | Iyer ................. | H04L 5/003 |
| 2022/0279538 A1* | 9/2022 | Jung ................ | H04L 5/0064 |

OTHER PUBLICATIONS

ZTE: "Other Enhancements for Rel-16 URLLC", 3GPP Draft, 3GPP TSG RAN WG1 #98, R1-1908241, Other Enhancements for REL-16 URLLC, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051764855, 13 Pages, Retrieved from the Internet: URL: http://www.3gpp.org/ftp/tsg_ran/WG1_RL1/TSGR1_98/Docs/R1-1908241.zip [retrieved on Aug. 17, 2019] section 2, section 2.3.

* cited by examiner

SYSTEMS AND METHODS FOR UPLINK TRANSMISSION OVERLAP RESOLUTION

CROSS-REFERENCE TO RELATED APPLICATIONS

This application claims the benefit of U.S. Provisional Patent Application No. 62/976,819, entitled, "SYSTEMS AND METHODS FOR UPLINK TRANSMISSION OVERLAP RESOLUTION," filed on Feb. 14, 2020, the disclosure of which is hereby incorporated by reference herein in its entirety as if fully set forth below and for all applicable purposes.

TECHNICAL FIELD

Aspects of the technology discussed below relate generally to wireless communication systems, and more particularly, but not by way of limitation, to resolving uplink transmission overlap. The discussed techniques can help a user equipment (UE) to transmit at least part of a lower priority transmission, such as an acknowledgement, with a higher priority transmission, which may improve latency in a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

BRIEF SUMMARY OF SOME ASPECTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, at a user equipment (UE), that a first scheduled uplink (UL) transmission corresponding to a first communication type having a first priority overlaps with a second scheduled UL transmission corresponding to a second communication type having a second priority. The first priority is higher than the second priority. The method also includes multiplexing at least a portion of the first scheduled UL transmission with at least a portion of the second scheduled UL transmission to generate a third UL transmission. The method further includes transmitting, from the UE to a base station, the third UL transmission.

In an additional aspect of the disclosure, an apparatus configured for wireless communication is disclosed. The apparatus includes at least one processor, and a memory coupled to the at least one processor. The at least one processor is configured to determine, at a user equipment (UE), that a first scheduled uplink (UL) transmission corresponding to a first communication type having a first priority overlaps with a second scheduled UL transmission corresponding to a second communication type having a second priority. The first priority is higher than the second priority. The at least one processor is also configured to multiplex at least a portion of the first scheduled UL transmission with at least a portion of the second scheduled UL transmission to generate a third UL transmission. The at least one processor is further configured to initiate transmission, from the UE to a base station, of the third UL transmission.

In an additional aspect of the disclosure, an apparatus configured for wireless communication is disclosed. The apparatus includes means for determining, at a user equipment (UE), that a first scheduled uplink (UL) transmission corresponding to a first communication type having a first priority overlaps with a second scheduled UL transmission corresponding to a second communication type having a second priority. The first priority is higher than the second priority. The apparatus also includes means for multiplexing at least a portion of the first scheduled UL transmission with at least a portion of the second scheduled UL transmission to generate a third UL transmission. The apparatus further includes means for transmitting, from the UE to a base station, the third UL transmission.

In an additional aspect of the disclosure, a non-transitory computer-readable medium stores instructions that, when executed by a processor, cause the processor to perform operations including determining, at a user equipment (UE), that a first scheduled uplink (UL) transmission corresponding to a first communication type having a first priority overlaps with a second scheduled UL transmission corresponding to a second communication type having a second priority. The first priority is higher than the second priority. The operations also include multiplexing at least a portion of the first scheduled UL transmission with at least a portion of the second scheduled UL transmission to generate a third UL transmission. The operations further include initiating transmission, from the UE to a base station, of the third UL transmission.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
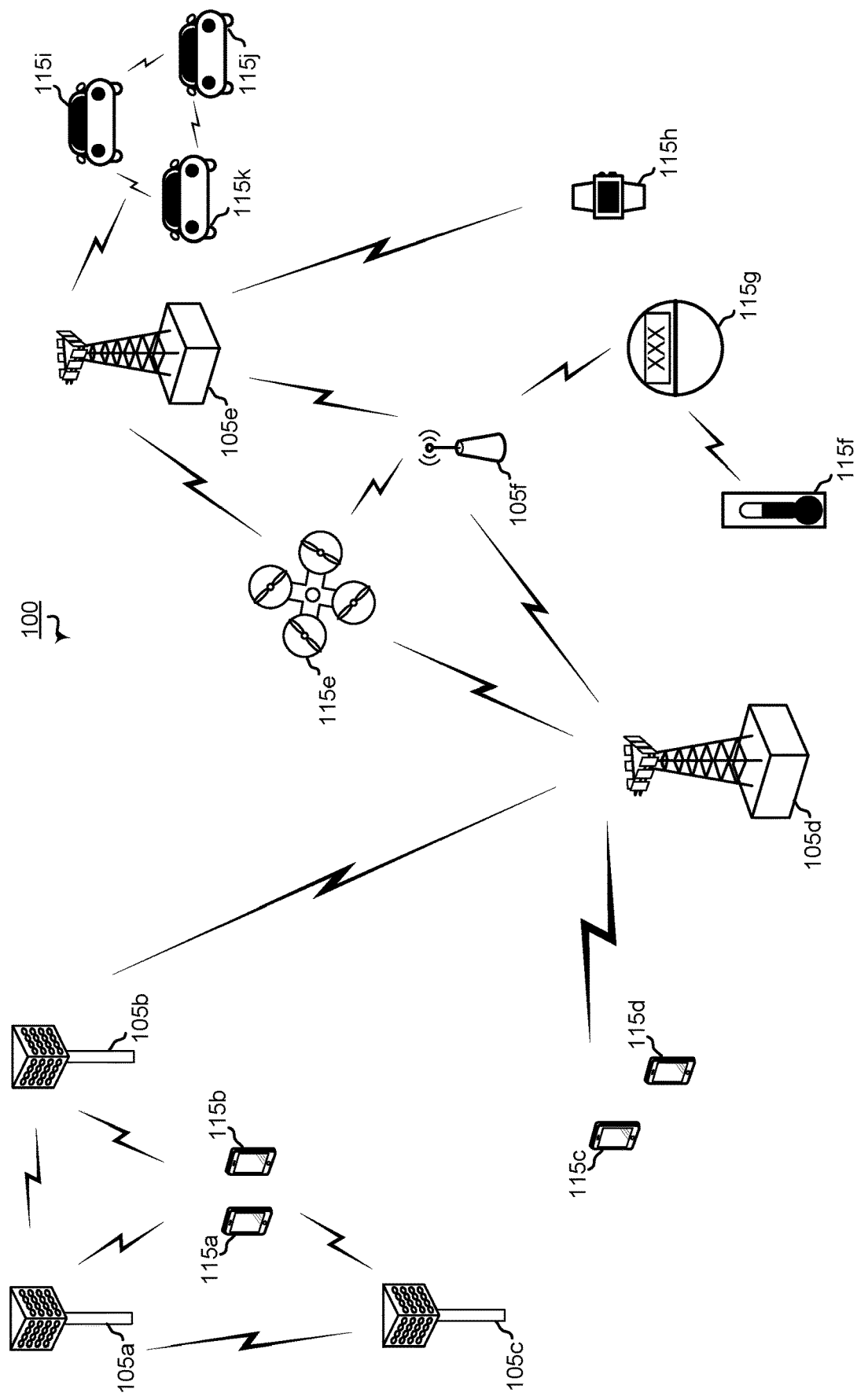
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

As the demand for mobile broadband access continues to increase, the possibilities of interference and congested networks grows with more user equipments (UEs) accessing long-range wireless communication networks and more short-range wireless systems being deployed in communities. Research and development continue to advance wireless technologies not only to meet the growing demand for mobile broadband access, but to advance and enhance the user experience with mobile communications.

UEs that communicate via more than one communication type may experience overlap (e.g., collision) between two uplink (UL) transmissions of the different communication types. One way to resolve the overlap is to multiplex the two UL transmissions if the UL transmissions have the same priority. However, if the UL transmission have different priority levels, resolving the overlap may include dropping (e.g., not transmitting) the UL transmission having the lower priority and only transmitting the UL transmission having the higher priority. Dropping an entirety of the lower priority UL transmission can increase latency within the wireless network for communications of the lower priority type.

The present disclosure provides systems, apparatus, methods, and computer-readable media that support UEs resolving UL transmission overlap (e.g., collisions) between communication types having different priorities without always dropping the lower priority UL transmission. For example, in some situations, a UE that detects an overlap between a first scheduled UL transmission of a first communication type and a second scheduled UL transmission of a second communication type may multiplex a portion of the second scheduled UL transmission with the first scheduled UL transmission to generate a third UL transmission that is transmitted to a base station. In some implementations, the portion of the second scheduled UL transmission may include a scheduling request (SR), an acknowledgement (ACK) (or a negative acknowledgement (NACK)), or both. In other situations, the UE may puncture one or more resource elements (REs) of the second scheduled UL transmission with one or more REs of an ACK of the first scheduled UL transmission to generate the third UL transmission. In still other situations, the UE may multiplex a portion of the second scheduled UL transmission with the first scheduled UL transmission to generate the third UL transmission. The portion of the second scheduled UL transmission may be a bundled ACK. The various situations depend on what type of messages are included in the first scheduled UL transmission and the second scheduled UL transmission, as further described herein. In this manner, a UE may refrain from entirely dropping a lower priority UL transmission, which enables information of the lower priority communication type to be transmitted, thereby improving latency for the lower priority communication type in the wireless network.

This disclosure relates generally to providing or participating in communication as between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g. radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality (AR) device, a virtual reality (VR) device, a vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 can support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
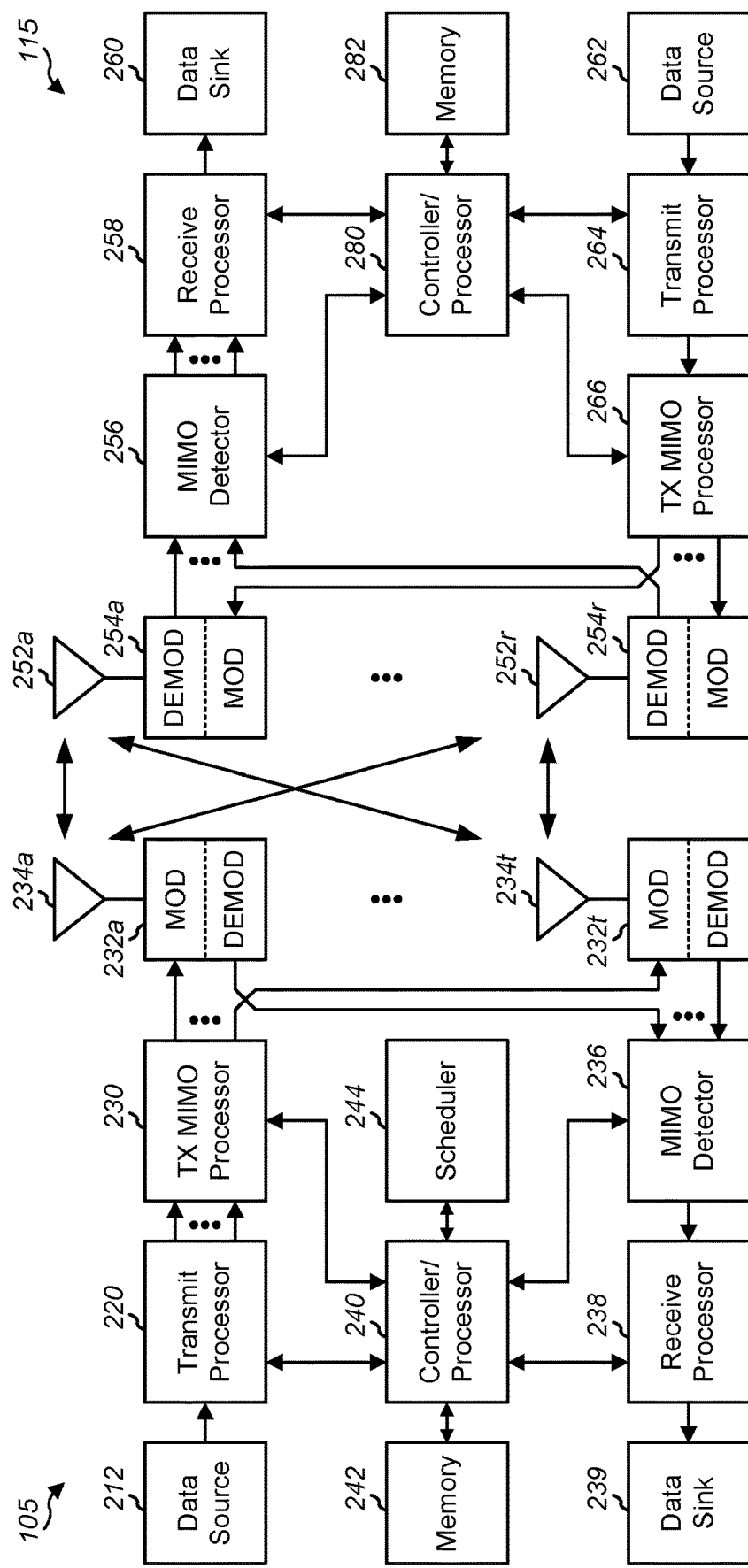
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH). Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference signals may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from the controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 8, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
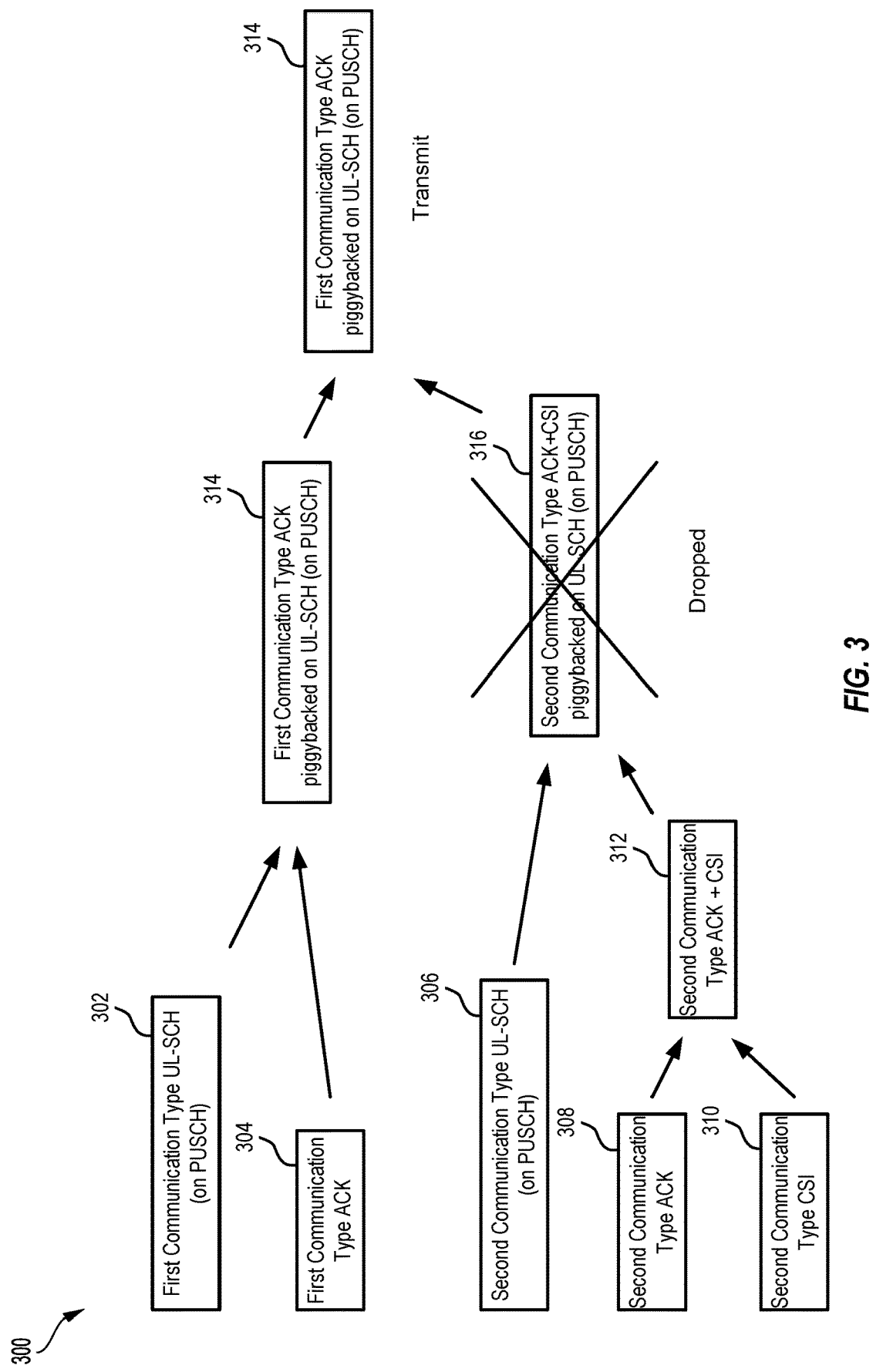
FIG. 3 is a diagram illustrating an example of resolving overlap of uplink (UL) transmissions according to one or more aspects.

UEs may communicate using a variety of wireless communication types. Some communication types have the same priority, while others have different priorities. Because these communication types can operate independently of each other, there may be overlap (e.g., collisions) between two scheduled UL transmissions. To resolve the overlap, a UE may multiplex (e.g., combine) a first scheduled UL transmission and a second scheduled UL transmission if the two UL transmissions have the same priority. If the two scheduled UL transmissions have different priorities, the lower priority scheduled UL transmission is dropped. FIG. 3 is a diagram illustrating an example of resolving overlap of UL transmissions according to one or more aspects.

In FIG. 3, a UE detects overlap between a first scheduled UL transmission of a first communication type and a second scheduled UL transmission of a second type. In the example of FIG. 3, the first communication type has a higher priority than the second communication type. As a non-limiting example, the first communication type may include or correspond to ultra-reliable low latency communications (URLLC) and the second communication type may include or correspond to enhanced mobile broadband (eMBB). Each scheduled UL transmission may include multiple elements on different channels. For example, the first scheduled UL transmission may include an uplink shared channel (UL-SCH) 302 on a physical uplink shared channel (PUSCH) and an acknowledgement (ACK) 304 on a physical uplink control channel (PUCCH). The second scheduled UL transmission may include a UL-SCH 306 on the PUSCH, an ACK 308 on the PUCCH, and a channel state information (CSI) 310 on the PUCCH. As used herein, an ACK may also refer to a negative acknowledgement (NACK). Additionally, an ACK may be included in, or may correspond to, a hybrid automatic repeat request acknowledgement (HARQ-ACK).

Step 1.1 of the resolving process is to multiplex all communications of the same communication type on the PUCCH together. For example, the UE may multiplex ACK 308 and CSI 310 to generate combined ACK and CSI 312 on the PUCCH. Step 1.2 of the resolving process is to multiplex all communications on the PUCCH with communications on the PUSCH of the same communication type. For example, the UE may multiplex UL-SCH 302 and ACK 304 to piggyback ACK 304 on UL-SCH 302 and generate combined ACK and UL-SCH 314. Additionally, the UE may multiplex UL-SCH 306 and combined ACK and CSI 312 to piggyback combined ACK and CSI 312 on UL-SCH 306 to generate combined ACK, CSI, and UL-SCH 316. Step 2 of the resolving process is to multiplex different types of communications on the PUSCH if the different types of communications have the same priority, and to drop the communication types that have a lower priority than a highest priority communication type. Because the first communication type has a higher priority than the second communication type, the UE drops combined ACK, CSI, and UL-SCH 316. The UE then transmits combined ACK and UL-SCH 314 (of the first communication type) to a base station.

Thus, a typical resolving process may drop an entirety of at least one communication type of transmission. Because the ACK of the dropped communication type is not transmitted, the base station does not receive an ACK in response to a previous communication. Thus, the base station may wait before transmitting an additional communication of the lower priority type, or may determine that the previous communication was not received and resend the previous communication. This increases latency within a wireless network for communications of the lower priority communication type.

The present disclosure provides systems, apparatus, methods, and computer-readable media that support UEs resolving UL transmission overlap (e.g., collisions) between communication types having different priorities without always dropping the lower priority UL transmission. For example, a UE may detect that a first scheduled UL transmission of a first communication type having a first priority overlaps (e.g., collides) with a second scheduled UL transmission of a second communication type having a second priority, where the first priority is greater than the second priority. The UE may multiplex at least a portion of the first scheduled UL transmission with at least a portion of the second scheduled UL transmission to generate a third UL transmission that is transmitted to a base station. In some situations, the UE may multiplex a portion of the second scheduled UL transmission with the first scheduled UL transmission to generate the third transmission. In some implementations, the portion of the second scheduled UL transmission may include a scheduling request (SR), an ACK, or both. In other situations, the UE may puncture one or more resource elements (REs) of the second scheduled UL transmission with one or more REs of an ACK of the first scheduled UL transmission to generate the third UL transmission. In still other situations, the UE may multiplex a portion of the second scheduled UL transmission with the first scheduled UL transmission to generate the third UL transmission. The portion of the second scheduled UL transmission may be a bundled ACK. The various situations depend on what type of messages are included in the first scheduled UL transmission and the second scheduled UL transmission, as further described herein. In this manner, a UE may refrain from entirely dropping a lower priority UL transmission, which enables information of the lower priority communication type to be transmitted, thereby improving latency for the lower priority communication type in the wireless network.

Figure 4:
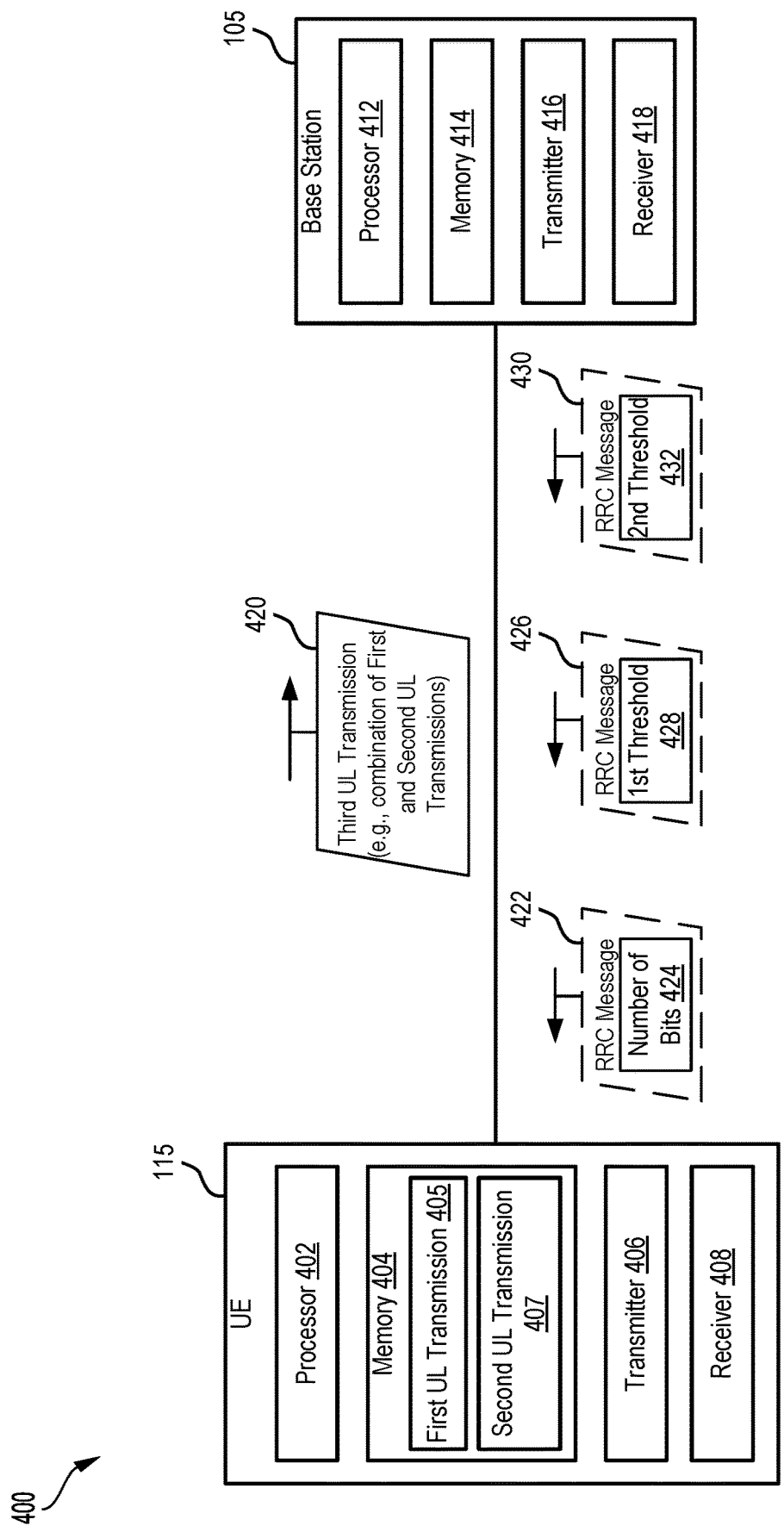
FIG. 4 is a block diagram of an example wireless communication system that supports resolution of overlap of UL transmissions according to one or more aspects.

FIG. 4 is a block diagram of an example wireless communications system 400 that supports resolution of overlap of UL transmissions according to one or more aspects. In some examples, wireless communications system 400 may implement aspects of wireless network 100. Wireless communications system 400 includes UE 115 and base station 105. Although one UE 115 and one base station 105 are illustrated, in other implementations, wireless communications system 400 may include more than one UE 115, more than one base station 105, or both.

UE 115 can include a variety of components (e.g., structural, hardware components) used for carrying out one or more functions described herein. For example, these components can include a processor 402, a memory 404, a transmitter 406, and a receiver 408. Processor 402 may be configured to execute instructions stored at memory 404 to perform the operations described herein. In some implementations, processor 402 includes or corresponds to controller 280, and memory 404 includes or corresponds to memory 282.

Transmitter 406 is configured to transmit reference signals, control signals, and data to one or more other devices, and receiver 408 is configured to receive reference signals, control signals, and data from one or more other devices. For example, transmitter 406 may transmit data, and receiver 408 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 406 and receiver 408 may be replaced with a transceiver. Additionally, or alternatively, transmitter 406, receiver 408, or both may include or correspond to one or more components of UE 115 described with reference to FIG. 2.

Base station 105 can include a variety of components (e.g., structural, hardware components) used for carrying out one or more functions described herein. For example, these components can include processor 412, memory 414, transmitter 416, and receiver 418. Processor 412 may be configured to execute instructions stored at memory 414 to perform the operations described herein. In some implementations, processor 412 includes or corresponds to controller 240, and memory 414 includes or corresponds to memory 242.

Transmitter 416 is configured to transmit reference signals, control signals, and data to one or more other devices, and receiver 418 is configured to receive reference signals, control signals, and data from one or more other devices. For example, transmitter 416 may transmit data, and receiver 418 may receive data, via a network, such as a wired network, a wireless network, or a combination thereof. For example, base station 105 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 416 and receiver 418 may be replaced with a transceiver. Additionally, or alternatively, transmitter 416, receiver, 418, or both may include or correspond to one or more components of base station 105 described with reference to FIG. 2.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

During operation of wireless communications system 400, UE 115 may determine that a first scheduled UL transmission 405 corresponding to a first communication type having a first priority overlaps (e.g., collides) with a second scheduled UL transmission 407 corresponding to a second communication type having a second priority. The first priority is higher (e.g., greater) than the second priority. As a non-limiting example, first scheduled UL transmission 405 may include or correspond to a URLLC communication, and second scheduled UL transmission 407 may include or correspond to an eMBB communication. In other examples, the scheduled UL transmissions may be other types, such as voice communications, data communications, quality-of-service (QoS) specified communications, etc. In some implementations, UE 115 multiplexes (e.g., combines)

at least a portion of first scheduled UL transmission 405 with at least a portion of second scheduled UL transmission 407 to generate third UL transmission 420. UE 115 then transmits third UL transmission 420 to base station 105 (instead of transmitting either first scheduled UL transmission 405 or second scheduled UL transmission 407). In some other implementations, UE 115 transmits first scheduled UL transmission 405 and drops (e.g., does not transmit) second scheduled UL transmission 407 instead of generating and transmitting third UL transmission 420. The situations in which UE 115 generates and transmits third UL transmission 420 or just transmits first scheduled UL transmission 405 are given by Table 1 below.

to generate and transmit third UL transmission 420. For example, (referring to column 3), when second scheduled UL transmission 407 includes only an ACK, UE 115 may multiplex the ACK with first scheduled UL transmission 405. As another example, (referring to rows 3-7 of column 5) when second scheduled UL transmission 407 includes a multiplexing of SR, ACK, and CSI, UE 115 may multiplex at least a portion of second scheduled UL transmission 407 with first scheduled UL transmission 405. As another example, (referring to row 3 of columns 6 and 7) when first scheduled UL transmission 405 includes an ACK and second scheduled UL transmission 407 includes a UL-SCH or a multiplexing of ACK, CSI, and UL-SCH, UE 115 may

TABLE 1

Example UL Transmissions

|  | 2nd Comm. Type SR on PUCCH | 2nd Comm. Type ACK on PUCCH | 2nd Comm. Type CSI on PUCCH | 2nd Comm. Type SR + ACK + CSI on PUCCH | 2nd Comm. Type UL-SCH on PUSCH | 2nd Comm. Type ACK + CSI + UL-SCH on PUSCH |
|---|---|---|---|---|---|---|
| 1st Comm. Type SR on PUCCH | Drop 2nd Comm. Type SR | Mux on 1st Comm. Type | Drop 2nd Comm. Type CSI | Drop 2nd Comm. Type SR + ACK + CSI | Drop 2nd Comm. Type UL-SCH | Drop 2nd Comm. Type ACK + CSI + UL-SCH |
| 1st Comm. Type ACK on PUCCH | Drop 2nd Comm. Type SR | Mux on 1st Comm. Type | Drop 2nd Comm. Type CSI | Mux on 1st Comm. Type | 1st Comm. Type Puncture on 2nd Comm. Type | 1st Comm. Type Puncture on 2nd Comm. Type |
| 1st Comm. Type CSI on PUCCH | Drop 2nd Comm. Type SR | Mux on 1st Comm. Type | Drop 2nd Comm. Type CSI | Mux on 1st Comm. Type | Drop 2nd Comm. Type UL-SCH | Drop 2nd Comm. Type CSI and UL-SCH, Bundle ACK, and Mux on 1st Comm. Type |
| 1st Comm. Type SR + ACK + CSI on PUCCH | Drop 2nd Comm. Type SR | Mux on 1st Comm. Type | Drop 2nd Comm. Type CSI | Mux on 1st Comm. Type | Drop 2nd Comm. Type UL-SCH | Drop 2nd Comm. Type CSI and UL-SCH, Bundle ACK, and Mux on 1st Comm. Type |
| 1st Comm. Type UL-SCH on PUSCH | Drop 2nd Comm. Type SR | Mux on 1st Comm. Type | Drop 2nd Comm. Type CSI | Mux on 1st Comm. Type | Drop 2nd Comm. Type UL-SCH | Drop 2nd Comm. Type CSI and UL-SCH, Bundle ACK, and Mux on 1st Comm. Type |
| 1st Comm. Type ACK + CSI + UL-SCH on PUSCH | Drop 2nd Comm. Type SR | Mux on 1st Comm. Type | Drop 2nd Comm. Type CSI | Mux on 1st Comm. Type | Drop 2nd Comm. Type UL-SCH | Drop 2nd Comm. Type CSI and UL-SCH, Bundle ACK, and Mux on 1st Comm. Type |

As shown in column 2 of Table 1, when second scheduled UL transmission 407 includes only a scheduling request (SR), UE 115 may drop second scheduled UL transmission 407 and only transmit first scheduled UL transmission 405. Additionally, as shown in column 4 of Table 1, when second scheduled UL transmission 407 includes only a channel state information (CSI), UE 115 may drop second scheduled UL transmission 407 and only transmit first scheduled UL transmission 405. As shown in column 6 of Table 1 (except in row 3), when second scheduled UL transmission 407 includes only an uplink shared channel (UL-SCH) and first scheduled UL transmission 405 does not include an ACK, UE 115 may drop second scheduled UL transmission 407 and only transmit first scheduled UL transmission 405. Additionally, as shown in row 2, column 5 and row 2, column 7 of Table 1, when first scheduled UL transmission 405 includes a SR and second scheduled UL transmission 407 includes a multiplexing (e.g., combination) of SR, ACK, and CSI or a multiplexing of ACK, CSI, and UL-SCH, UE 115 may drop second scheduled UL transmission 407 and only transmit first scheduled UL transmission 405.

Column 3, rows 3-7 of column 5, row 3 of column 6, and rows 3-7 of column 7 correspond to UE 115 multiplexing at least a portion of first scheduled UL transmission 405 with at least a portion of second scheduled UL transmission 407 multiplex a portion of first scheduled UL transmission 405 with second scheduled UL transmission 407 by performing a puncturing operation. As another example, (referring to rows 4-7 of column 7), when second scheduled UL transmission 407 includes a multiplexing of ACK, CSI, and UL-SCH, and first scheduled UL transmission 405 does not include only a SR or only an ACK, UE 115 may multiplex at least a portion of second scheduled UL transmission 407 with first scheduled UL transmission 405. These examples are further described below.

In some implementations (e.g., referring to column 3 of Table 1), second scheduled UL transmission 407 includes only an ACK on the PUCCH. In some such implementations, first scheduled UL transmission 405 may include a SR, an ACK, a CSI, a multiplexing of SR, ACK, and CSI, a UL-SCH, or a multiplexing of ACK, CSI, and UL-SCH. In some such implementations, UE 115 may bundle the ACK of second scheduled UL transmission 407 into a bundled ACK having X bits. Bundling the ACK reduces the size of the ACK while still retaining at least some of the information in the ACK. In some implementations, the bundling operation may include or correspond to a bitwise XOR operation. The number of bits in the bundled ACK (e.g., X) may be radio resource control (RRC) configurable. For example, UE 115 may receive a RRC message indicating X. UE 115 may append the bundled ACK to the end of the payload/codebook of the ACK of first scheduled UL transmission 405, and both ACKs may be jointly encoded, if first scheduled UL transmission 405 includes an ACK. If first scheduled UL transmission 405 does not include an ACK, the bundled ACK may serve as the ACK for third UL transmission 420. Thus, multiplexing the bundled ACK with first scheduled UL transmission 405 generates third UL transmission 420.

In some implementations (e.g., referring to rows 3-7 of column 5 of Table 1), first scheduled UL transmission 405 includes an ACK on a PUCCH, a CSI on the PUCCH, a multiplexing (e.g., combination) of at least two or more of a SR, the ACK, and the CSI on the PUCCH, a UL-SCH on a PUSCH, or a multiplexing of at least two or more of the ACK, the CSI, and the UL-SCH on the PUSCH. In some such implementations, second scheduled UL transmission 407 includes a multiplexing of at least two or more of a second SR, a second CSI, and a second ACK on the PUCCH. In some such implementations, UE 115 may bundle the second ACK into a particular number of bits and increase a priority of the bundled second ACK to the first priority. For example, UE 115 may bundle the second ACK of second scheduled UL transmission 407 into a bundled ACK having Y bits, and UE 115 may increase the priority of the bundled second ACK to the priority of first scheduled UL transmission 405. Bundling the second ACK reduces the size of the second ACK while still retaining at least some of the information in the second ACK. In some implementations, the bundling operation may include or correspond to a bitwise XOR operation. The number of bits in the bundled second ACK (e.g., Y) may be RRC configurable. For example, UE 115 may receive a RRC message 422 from base station 105. RRC message 422 may indicate a particular number of bits 424 (e.g., Y).

In some such implementations, first scheduled UL transmission 405 does not include the SR, and multiplexing the at least a portion of first scheduled UL transmission 405 with the at least a portion of second scheduled UL transmission 407 may include multiplexing the second SR and the bundled second ACK with first scheduled UL transmission 405. For example, if first scheduled UL transmission 405 does not include the SR but second scheduled UL transmission 407 includes the second SR, the second SR may be included in third UL transmission 420. In some such implementations, the bundled second ACK is appended to an end of a payload of the ACK of first scheduled UL transmission 405 and jointly encoded with the ACK. Additionally, the second SR may be multiplexed with first scheduled UL transmission 405. For example, if first scheduled UL transmission 405 includes the ACK, the bundled second ACK may be appended to the end of a payload/codebook and jointly encoded with the ACK. Alternatively, if first scheduled UL transmission 405 does not include the ACK, the bundled second ACK may serve as the ACK of first scheduled UL transmission 405, and the second SR is multiplexed with first scheduled UL transmission 405. For example, the bundled second ACK of second scheduled UL transmission 407 may be included a resource element designated for an ACK of first scheduled UL transmission 405. In both implementations (e.g., regardless of whether first scheduled UL transmission 405 includes the ACK), UE 115 may drop the second CSI of second scheduled UL transmission 407 in generating third UL transmission 420.

In some other such implementations, first scheduled UL transmission 405 includes the SR, and multiplexing the at least a portion of first scheduled UL transmission 405 with the at least a portion of second scheduled UL transmission 407 may include multiplexing the bundled second ACK with first scheduled UL transmission 405. The multiplexing may also include dropping the second SR, the second CSI, or both. For example, if first scheduled UL transmission 405 includes the SR and second scheduled UL transmission 407 includes the second SR, the second SR may be dropped in forming third UL transmission 420 (in addition to dropping the second CSI). Dropping the second SR may not affect communications to UE 115, because only one SR is needed.

In some other such implementations, first scheduled UL transmission 405 includes the UL-SCH on the PUSCH or the multiplexing of at least two or more of the ACK, the CSI, and the UL-SCH on the PUSCH, and multiplexing the at least a portion of first scheduled UL transmission 405 with the at least a portion of second scheduled UL transmission 407 may include multiplexing the bundled second ACK with first scheduled UL transmission 405. The multiplexing may also include dropping the second SR, the second CSI, or both. For example, if first scheduled UL transmission 405 includes the UL-SCH or the multiplexing of at least two or more of the ACK, the CSI, and the UL-SCH, and second scheduled UL transmission 407 includes the second SR, the second SR may be dropped in forming third UL transmission 420 (in addition to dropping the second CSI).

Figure 5:
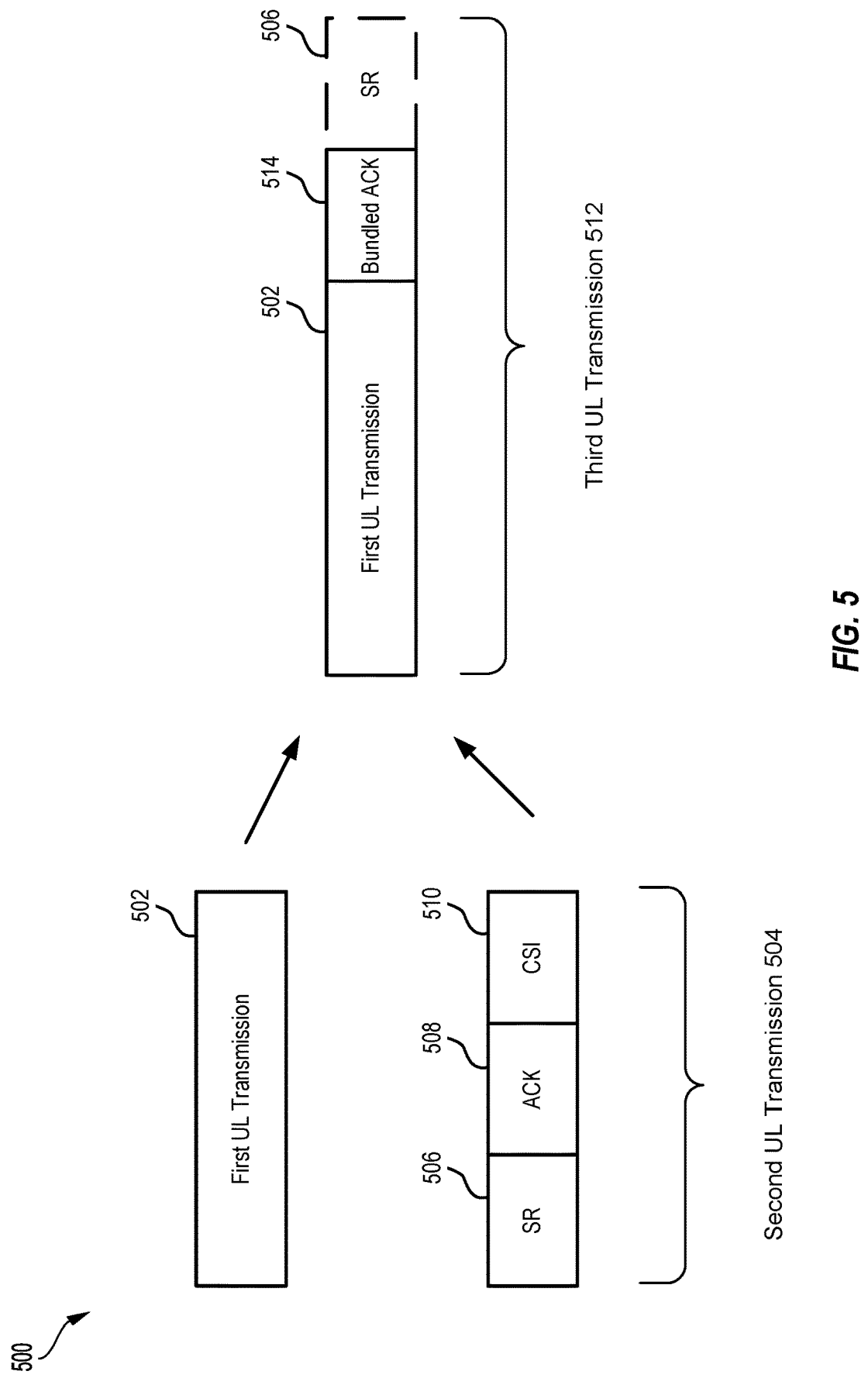
FIG. 5 is a diagram illustrating an example of multiplexing a portion of a second UL transmission with a first UL transmission according to one or more aspects.

To illustrate, FIG. 5 is a diagram illustrating an example 500 of multiplexing a portion of second scheduled UL transmission 407 with first scheduled UL transmission 405 according to one or more aspects. In FIG. 5, first scheduled UL transmission 502 may include or correspond to first scheduled UL transmission 405, and second scheduled UL transmission 504 may include or correspond to second scheduled UL transmission 407. First scheduled UL transmission 502 is of a first communication type that has a first priority that is higher (e.g., greater) than a second priority of a second communication type of second scheduled UL transmission 504. First scheduled UL transmission 502 may include an ACK on a PUCCH, a CSI on the PUCCH, a multiplexing of a SR, the ACK, and the CSI on the PUCCH, a UL-SCH on the PUSCH, or a multiplexing of the ACK, the CSI, and the UL-SCH on the PUSCH. In the example of FIG. 5, second scheduled UL transmission 504 includes a second SR 506, a second ACK 508, and a second CSI 510. In other examples, second scheduled UL transmission 504 includes at least two of second SR 506, second ACK 508, and second CSI 510 (e.g., second SR 506 and second ACK 508, second SR 506 and second CSI 510, or second ACK 508 and second CSI 510).

UE 115 may multiplex at least a portion of second scheduled UL transmission 504 with first scheduled UL transmission 502 to generate third UL transmission 512. Third UL transmission 512 may include or correspond to third UL transmission 420 of FIG. 4. As shown in FIG. 5, multiplexing at least a portion of second scheduled UL transmission 504 with first scheduled UL transmission 502 includes generating a bundled second ACK 514 and including bundled second ACK 514 in third UL transmission 512. In some implementations, if first scheduled UL transmission 502 includes the ACK, bundled second ACK 514 is appended to an end of a payload/codebook of the ACK and jointly encoded with the ACK. Alternatively, if first scheduled UL transmission 502 does not include the ACK, bundled second ACK 514 may serve as the ACK of third UL transmission 512. In some implementations, second SR 506 may be multiplexed with first scheduled UL transmission 502. For example, if first scheduled UL transmission 502 does not include the SR, second SR 506 may be included in third UL transmission 512. Alternatively, if first scheduled UL transmission 502 includes the SR (e.g., multiplexed with the ACK, the CSI, or both), then second SR 506 may be dropped and not included in third UL transmission 512. In either implementation, second CSI 510 is dropped and not included in third UL transmission 512.

Returning to FIG. 4, in some implementations (e.g., corresponding to row 3, column 7 and row 3, column 8 of Table 1), first scheduled UL transmission 405 includes an ACK on a PUCCH. In some such implementations, second scheduled UL transmission 407 may include a UL-SCH on a PUSCH or a multiplexing of at least two or more of a CSI, a second ACK, and the UL-SCH on the PUSCH. In some such implementations, multiplexing at least a portion of first scheduled UL transmission 405 with the at least a portion of second scheduled UL transmission 407 may include puncturing one or more resource elements (REs) of the UL-SCH on the PUSCH of second scheduled UL transmission 407 with one or more REs of the ACK of first scheduled UL transmission 405. Puncturing the one or more REs of the UL-SCH with one or more REs of the ACK includes replacing the one or more REs of the UL-SCH of second scheduled UL transmission 407 with the one or more REs of the ACK of first scheduled UL transmission 405.

In some implementations, puncturing the one or more REs of the UL-SCH of second scheduled UL transmission 407 may include puncturing a first RE of the UL-SCH that is one orthogonal frequency division multiplexing (OFDM) symbol to the left of a last demodulation reference signal (DMRS) and puncturing a second RE of the UL-SCH that is one OFDM symbol to the right of the last DMRS. If additional REs are needed to be punctured, the puncturing may continue to the left of the last DMRS, followed by to the right of the last DMRS. For example, puncturing the one or more REs of the UL-SCH of second scheduled UL transmission 407 may include puncturing a third RE of the UL-SCH that is one OFDM symbol to the left of the RE and puncturing a fourth RE of the UL-SCH that is one OFDM symbol to the right of the second RE.

In some other implementations, puncturing the one or more REs of the UL-SCH of second scheduled UL transmission 407 may include puncturing OFDM symbols that are one OFDM symbol to the left of a last DMRS in each RE of the UL-SCH and puncturing OFDM symbols that are one OFDM symbol to the right of the last DMRS in each RE of the UL-SCH. If additional puncturing is needed, puncturing may continue one OFDM symbol to the left, followed by one OFDM symbol to the right. For example, puncturing the one or more REs of the UL-SCH of second scheduled UL transmission 407 may further include puncturing OFDM symbols that are two OFDM symbols to the left of the last DMRS in each RE of the UL-SCH and puncturing OFDM symbols that are two OFDM symbols to the right of the last DMRS in each RE of the UL-SCH.

Figure 6:
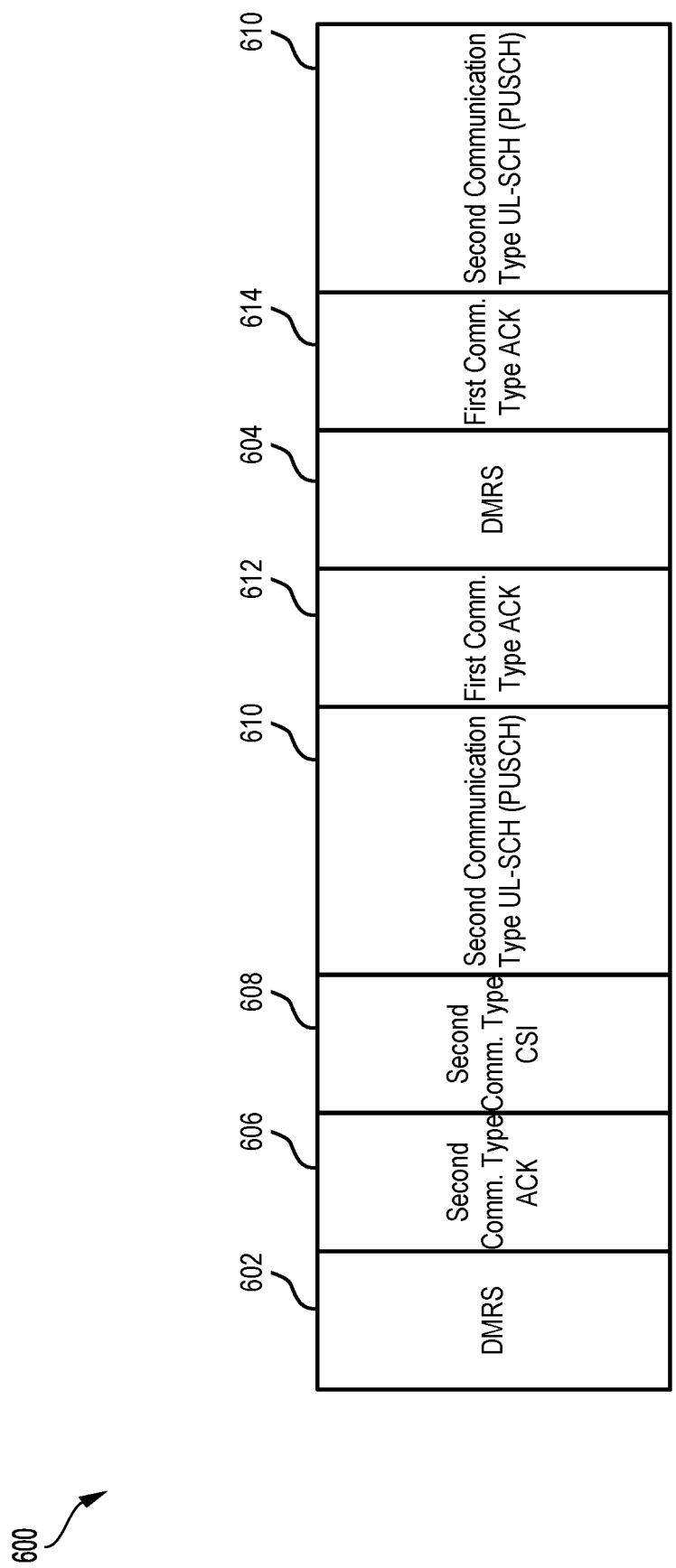
FIG. 6 is a diagram illustrating an example of puncturing one or more portions of a second UL transmission with one or more portions of a first UL transmission according to one or more aspects.

To illustrate, FIG. 6 is a diagram illustrating an example 600 of puncturing one or more portions of a second scheduled UL transmission with one or more portions of a first scheduled UL transmission according to one or more aspects. The first scheduled UL transmission is of a first communication type having a first priority that is higher (e.g., greater) than a second priority of a second communication type of the second scheduled UL transmission. In FIG. 6, the second scheduled UL transmission includes a first DMRS 602, a second DMRS 604 (e.g., a last DMRS), a second communication type ACK 606, a second communication type CSI 608, and a second communication type UL-SCH 610 that is divided by the second DMRS 604. The second communication type has a lower (e.g., lesser) priority than a first communication type of a first scheduled UL transmission, as described with reference to FIG. 4.

To puncture the second scheduled UL transmission with the ACK of the first scheduled UL transmission, an OFDM symbol to the left of the last DMRS (e.g., second DMRS 604) may be replaced with a portion of first communication type ACK 612. If the number of REs in the first communication type ACK is one, this is sufficient, and puncturing may stop. If additional puncturing is needed, an OFDM symbol to the right of the last DMRS (e.g., second DMRS 604) may be replaced with a second portion of first communication type ACK 614. Puncturing may stop if the first communication type ACK includes only two REs. If additional puncturing is needed, a next OFDM symbol to the left of portion of first communication type ACK 612 may be punctured, followed by an OFDM symbol to the right of second portion of first communication type ACK 614. This same left to right puncturing may continue until an entirety of the first communication type ACK punctures the second scheduled UL transmission, or until one or more conditions are reached, as further described herein.

Puncturing the one or more REs of the UL-SCH may include refraining from puncturing a RE of a DMRS. For example, first DMRS 602 and second DMRS 604 may not be punctured by the first communication type ACK. In some implementations, puncturing the one or more REs of the UL-SCH may include refraining from puncturing a RE of the CSI. For example, second communication type CSI 608 may not be punctured by the first communication type ACK. In other implementations, puncturing the one or more REs of the UL-SCH may include puncturing one or more REs of the CSI. For example, one or more REs or one or more portions of second communication type CSI 608 may be punctured by the first communication type ACK in some implementations.

In some implementations, the UL-SCH of the second scheduled UL transmission may include multiple multiple-input, multiple-output (MIMO) layers. In some such implementations, puncturing the one or more REs of the UL-SCH may include puncturing only a first MIMO layer of the UL-SCH. For example, the first MIMO layer of the UL-SCH may always be the MIMO layer that is punctured. In some other implementations, each MIMO layer of the multiple MIMO layers may correspond to a different modulation and coding scheme (MCS), and puncturing the one or more REs of the UL-SCH may include puncturing only a MIMO layer of the UL-SCH having the highest MCS. For example, only the MIMO layer having the highest MCS may be punctured. In some other implementations, puncturing the one or more REs of the UL-SCH may include puncturing each layer of the multiple MIMO layers. The multiple MIMO layers may be punctured in a sequential order starting with a first MIMO layer. For example, if there are three MIMO layers, the puncturing may include puncturing the first MIMO layer, followed by puncturing the second MIMO layer, followed by puncturing the third MIMO layer. If additional puncturing is needed, the sequential order may be repeated, starting with puncturing the first MIMO layer and ending with puncturing the third MIMO layer. Alternatively, each MIMO layer may be punctured in the same manner. For example, bit 1 may be punctured in MIMO layers one, two and three, followed by puncturing bit 2 in MIMO layers one, two, and three, and so forth. Puncturing in this manner may use more REs of the UL-SCH, but may increase reliability that the first communication type ACK is properly puncturing the UL-SCH. Alternatively, puncturing the MIMO layers in sequential order may reduce the amount of REs used by puncturing process.

In some implementations, UE 115 may determine a number of REs in the ACK of the first scheduled UL transmission prior to puncturing the UL-SCH of the second scheduled UL transmission with the ACK (e.g., the first communication type ACK). For example, UE 115 may determine the number of REs in the ACK based on a payload size of the ACK, a beta factor corresponding to the ACK, and a modulation order corresponding to the ACK.

The beta factor may be communicated to UE 115 in a number of ways. In some implementations, the beta factor is included in multiple downlink control information (DCI) grants corresponding to the first communication type. For example, the beta factor may be repeated in all DCI grants scheduling physical downlink shared channels (PDSCHs) corresponding to the first communication type and having an ACK multiplexed with the second scheduled UL transmission. In some other implementations, the beta factor is included in a last DCI grant corresponding to the first communication type. For example, the last DCI grant scheduling a PDSCH corresponding to the first communication type and having an ACK multiplexed with the second scheduled UL communication may include or indicate the beta factor. In some other implementations, the beta factor is included in a UL grant scheduling the PUSCH based on all DCI grants being received before the UL grant. For example, the beta factor may be included in or indicated by a UL grant scheduling the UL-SCH on the PUSCH if all the DL grants corresponding to the first communication type are received before the UL grant.

Returning to FIG. 4, in some implementations, instead of always performing puncturing, UE 115 may perform puncturing only if one or more conditions are not satisfied. An example with a fourth scheduled UL transmission and a fifth scheduled transmission is described. In this example, UE 115 may determine that a fourth scheduled UL transmission corresponding to the first communication type (e.g., having the first priority) overlaps with (e.g., collides with) a fifth scheduled UL transmission corresponding the second communication type (e.g., having the second priority). UE 115 may also determine whether to puncture one or more REs of a second UL-SCH of the fifth scheduled UL transmission with one or more REs of the fourth scheduled UL transmission based on the one or more conditions. For example, UE 115 may multiplex at least a portion of the fourth scheduled UL transmission with at least a portion of the fifth scheduled UL transmission (e.g., by performing one or more puncturing operations) to generate a sixth UL transmission based on the one or more conditions not being satisfied. Alternatively, UE 115 may, based on the one or more conditions being satisfied, drop the fifth scheduled UL transmission and transmit, to base station 105, the fourth scheduled UL transmission. Thus, if the one or more conditions are not satisfied, UE 115 may multiplex a third ACK of the fourth scheduled UL transmission with the fifth scheduled UL transmission through puncturing the second UL-SCH of the fifth scheduled UL transmission, as described above, and if the one or more conditions are satisfied, UE 115 does not multiplex the fourth scheduled UL transmission and the fifth scheduled UL transmission and instead transmits the fourth scheduled UL transmission because the fourth scheduled UL transmission has a higher priority.

The one or more conditions may be referred to as "fallback conditions," such that UE 115 falls back from the puncturing operation to drop the lower priority scheduled UL transmission. In some implementations, the fourth scheduled UL transmission includes a third ACK, the fifth scheduled UL transmission includes a multiplexing of a fourth ACK, a second CSI, and a second UL-SCH, and the one or more conditions include a number of REs of the third ACK exceeding a number of REs of the second UL-SCH. For example, if the third ACK is larger than the second UL-SCH (e.g., the number of REs of the third ACK is greater than the number of REs of the second UL-SCH), the second UL-SCH is not large enough to hold the third ACK, and thus puncturing may not occur. Additionally, or alternatively, the fourth scheduled UL transmission includes the third ACK, the fifth scheduled UL transmission includes a multiplexing of the fourth ACK, the second CSI, and the second UL-SCH, and the one or more conditions includes the third ACK puncturing one or more REs of the second CSI. For example, if the puncturing of the second UL-SCH would be insufficient for inserting all of the third ACK, puncturing of the second CSI would occur. This may be sufficiently undesirable that it is better to simply drop the fifth scheduled UL transmission than allow the second CSI to be punctured. Additionally, or alternatively, the fourth scheduled UL transmission may include the third ACK, the fifth scheduled UL transmission may include a multiplexing of the fourth ACK, a second CSI, and the second UL-SCH, the second CSI may include a first portion and a second portion, and the one or more conditions may include a number of REs of the third ACK exceeding a number of REs of the second UL-SCH and the second portion of the second CSI. For example, the second portion of the second CSI may be punctured, but if the first portion of the second CSI is punctured, UE 115 may instead drop the fifth scheduled UL transmission and transmit only the fourth scheduled UL transmission. In some such implementations, the first portion of the second CSI includes a channel quality indicator (CQI), and the second portion of the second CSI includes precoding information, a precoding matrix indicator (PMI), reference signal received power (RSRP) information, or a combination thereof. Thus, the information included in the second portion of the second CSI may be determined to be not important enough that puncturing of the second portion of the second CSI can occur, but the information in the first portion of the second CSI is important enough that puncturing should not occur. Additionally, or alternatively, in more aggressive implementations, even the first portion of the second CSI may be allowed to be punctured, as long as the fourth ACK is not punctured. For example, the fourth scheduled UL transmission may include the third ACK, the fifth scheduled UL transmission may include a multiplexing of the fourth ACK, the second CSI, and the second UL-SCH, and the one or more conditions include a number of REs of the third ACK exceeding a number of REs of the second UL-SCH and the second CSI (e.g., the second UL-SCH and an entirety of the second CSI do not contain enough REs for the third ACK, and thus the fourth ACK would be punctured). Puncturing the fourth ACK may be sufficiently undesirable that it is better for UE 115 to drop the fifth scheduled UL transmission and only transmit the fourth scheduled UL transmission.

Additionally, or alternatively, the one or more conditions may include a percentage of REs being punctured in the second UL-SCH exceeding a threshold. For example, if more than 50% of the second UL-SCH would be punctured, UE 115 may instead drop the fifth scheduled UL transmission and transmit only the fourth scheduled UL transmission. In some such implementations, this threshold is RRC configurable. For example, the threshold may be included in a RRC message received from base station 105. To illustrate, UE 115 may receive RRC message 426 from base station 105. RRC message 426 may include or indicate first threshold 428 (e.g., the percentage threshold).

Additionally, or alternatively, the one or more conditions may include a number of bits in the third ACK of the fourth scheduled UL transmission exceeding a threshold. For example, if more than 128 bits of the second UL-SCH would be punctured, UE 115 may instead drop the fifth scheduled UL transmission and transmit only the fourth scheduled UL transmission. In some such implementations, this threshold is RRC configurable. For example, the threshold may be included in a RRC message received from base station 105. To illustrate, UE 115 may receive RRC message 430 from base station 105. RRC message 430 may include or indicate second threshold 432 (e.g., the number of bits threshold). These examples are not limiting, and in other implementations, the one or more conditions may include other conditions.

Although puncturing has been described with respect to puncturing second scheduled UL transmission 407 with the ACK of first scheduled UL transmission 405, in other implementations, other portions of first scheduled UL transmission 405 may puncture second scheduled UL transmission 407. For example, a first portion of the CSI of first scheduled UL transmission 405, a second portion of the CSI, or even a UL-SCH of first scheduled UL transmission 405 may puncture second scheduled UL transmission 407. In some implementations, the priority for puncturing is ACK→first portion of CSI→second portion of CSI→UL-SCH. Puncturing using these additional elements of first scheduled UL transmission 405 may occur as long as the one or more conditions are not satisfied.

In some implementations (referring to rows 4-7 of column 7 of Table 1), at least a portion of first scheduled UL transmission 405 and at least a portion of second scheduled UL transmission 407 may be multiplexed without puncturing. To illustrate, in some such implementations, first scheduled UL transmission 405 includes a CSI on a PUCCH, a multiplexing of at least two or more of a SR, an ACK, and the CSI on the PUCCH, a UL-SCH on a PUSCH, or a multiplexing of at least two or more of the ACK, the CSI, and the UL-SCH on the PUSCH. In some such implementations, second scheduled UL transmission 407 includes a multiplexing of at least two or more of a second CSI, a second ACK, and a second UL-SCH on the PUSCH. In some such implementations, multiplexing the at least a portion of the first scheduled UL transmission with the at least a portion of the second scheduled UL transmission may include dropping the second CSI and the second UL-SCH, bundling the second ACK into a particular number of bits (e.g., Z bits), increasing a priority of the bundled second ACK to the first priority, and multiplexing the bundled second ACK with first scheduled UL transmission 405 to generate third UL transmission 420. For example, UE 115 may bundle the second ACK (e.g., reduce the number of bits of the second ACK) to a particular number of bits and multiplex the bundled second ACK with first scheduled UL transmission 405. UE 115 may drop the second CSI and the second UL-SCH. In some such implementations (e.g., if first scheduled UL transmission 405 includes the ACK), the bundled second ACK may be appended to an end of a payload or codebook of the ACK of first scheduled UL transmission 405 and jointly encoded with the ACK to generate third UL transmission 420. Alternatively (e.g., if first scheduled UL transmission 405 does not include the ACK), the bundled second ACK may serve as the ACK of first scheduled UL transmission 405. Additionally, or alternatively, the particular number of bits (e.g., Z bits) may be RRC configurable. For example, the particular number of bits may be received in a RRC message from base station 105, similar to particular number of bits 424 being received in RRC message 422 as described above.

Figure 7:
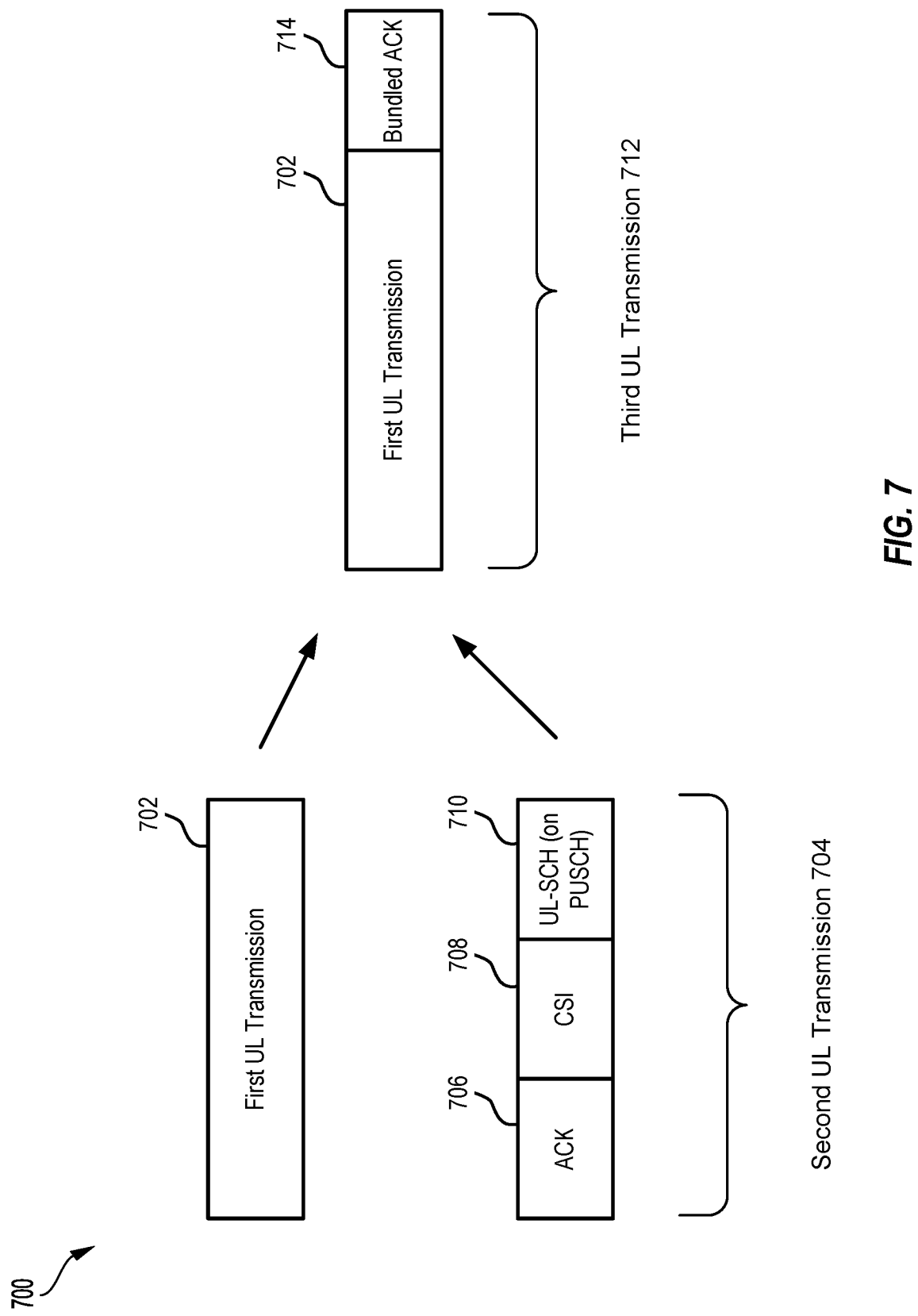
FIG. 7 is a diagram illustrating another example of multiplexing a portion of a second UL transmission with a first UL transmission according to one or more aspects.

To illustrate, FIG. 7 is a diagram illustrating another example 700 of multiplexing a portion of second scheduled UL transmission 704 with first scheduled UL transmission 702 according to one or more aspects. In some implementations, first scheduled UL transmission 702 includes or corresponds to first scheduled UL transmission 405, and second scheduled UL transmission 704 includes or corresponds to second scheduled UL transmission 407. First scheduled UL transmission 702 is of a first communication type having a first priority that is higher (e.g., greater) than a second priority of a second communication type of second scheduled UL transmission 704. First scheduled UL transmission 702 may include a CSI on a PUCCH, a multiplexing of at least two or more of a SR, an ACK, and the CSI on the PUCCH, a UL-SCH on a PUSCH, or a multiplexing of at least two or more of the ACK, the CSI, and the UL-SCH on the PUSCH. In the example shown in FIG. 7, second scheduled UL transmission 704 includes second ACK 706, second CSI 708, and second UL-SCH 710 (on the PUSCH). In other examples, second scheduled UL transmission 704 includes at least two of second ACK 706, second CSI 708, and second UL-SCH 710 (e.g., second ACK 706 and second CSI 708, second ACK 706 and second UL-SCH 710, or second CSI 708 and second UL-SCH 710).

UE 115 may multiplex at least a portion of second scheduled UL transmission 704 with first scheduled UL transmission 702 to generate third UL transmission 712, which may be transmitted from UE 115 to base station 105. For example, UE 115 may generate bundled second ACK 714 by bundling (e.g., reducing to a particular number of bits) second ACK 706. UE 115 may multiplex bundled second ACK 714 with first scheduled UL transmission 702 to generate third UL transmission 712. As described above, in some implementations (e.g., if first scheduled UL transmission 702 includes the ACK), bundled second ACK 714 may be appended to an end of a payload/codebook of the ACK of first scheduled UL transmission 702 and jointly encoded with the ACK to generate third UL transmission 712. Alternatively (e.g., if first scheduled UL transmission 702 does not include the ACK), bundled second ACK 714 may serve as the ACK of first scheduled UL transmission 702. As can be seen in FIG. 7, UE 115 drops second CSI 708 and second UL-SCH 710 (e.g., second CSI 708 and second UL-SCH 710 are not multiplexed with first scheduled UL transmission 702). FIG. 7 thereby illustrates an example of multiplexing at least portions of two scheduled UL transmissions together in some of the implementations described with reference to FIG. 4.

As described above with reference to FIG. 4, the present disclosure describes various techniques for multiplexing at least a portion of first scheduled UL transmission 405 with at least a portion of second scheduled UL transmission 407 to generate third UL transmission 420. Multiplexing second scheduled UL transmission 407 with first scheduled UL transmission 405, instead of simply dropping second scheduled UL transmission 407, may enable portions of transmissions, such as ACKs, having a lower priority than first scheduled UL transmission 405 to be transmitted instead of dropped. Transmitting the ACKs may improve latency of communications having the second priority within wireless communications system 400.

Figure 8:
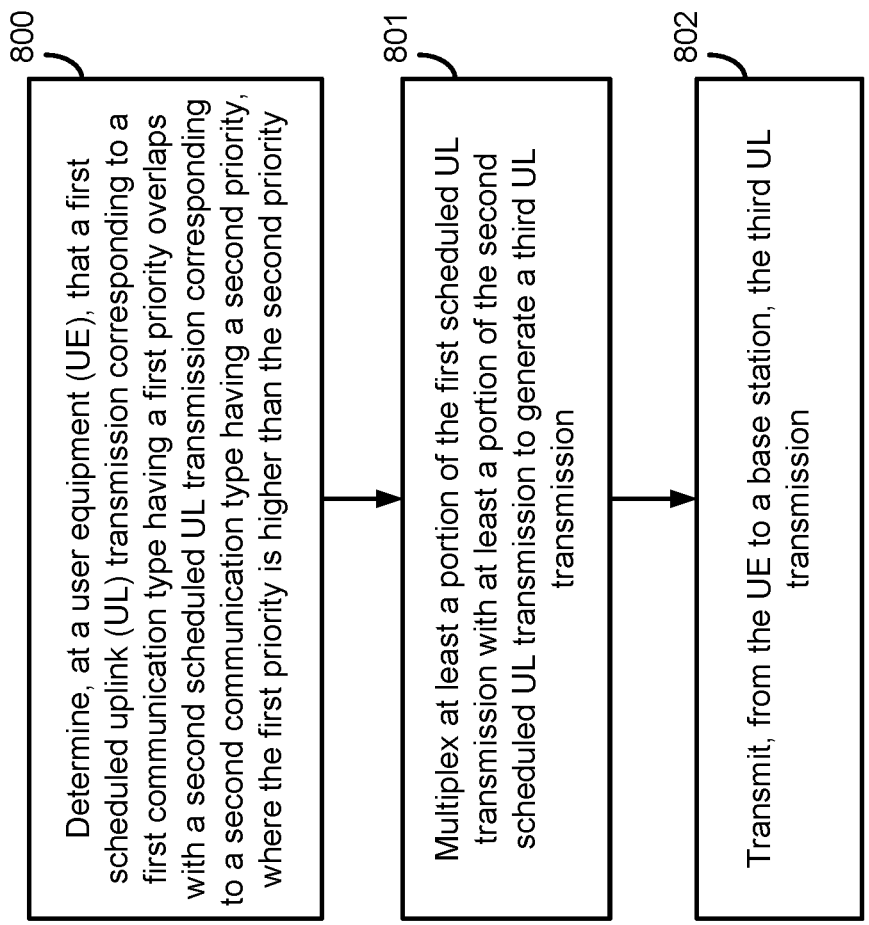
FIG. 8 is a flow chart of an example of a method to resolve overlap of UL transmissions according to one or more aspects.
Figure 9:
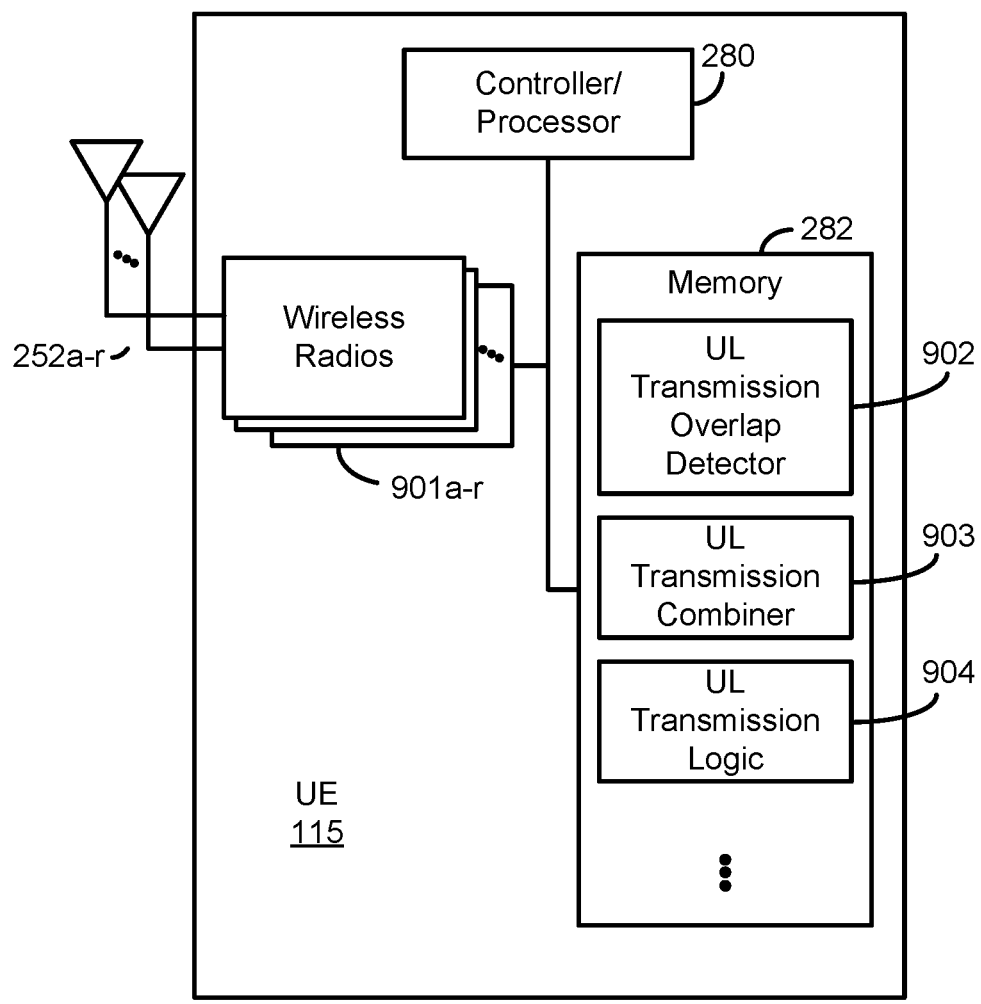
FIG. 9 is a block diagram of an example UE that supports resolving overlap of UL transmissions according to one or more aspects.

FIG. 8 is a flow diagram illustrating an example method that supports resolving overlap of UL transmissions according to one or more aspects. Operations of the method illustrated in FIG. 8 may be performed by a UE, such as UE 115 described above with reference to FIGS. 1-7. Operations of the method will also be described with respect to UE 115 as illustrated in FIG. 9. FIG. 9 is a block diagram of an example UE 115 that supports resolving overlap of UL transmissions according to one or more aspects. In some implementations, UE 115 includes the structure, hardware, and components as illustrated for UE 115 of FIGS. 1-3. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 901a-r and antennas 252a-r. Wireless radios 901a-r include various components and hardware, as illustrated in FIG. 2 for UE 115, including modulator and demodulators 254a-r, MIMO detector 256, receive processor 258, transmit processor 264, and TX MIMO processor 266.

Returning to FIG. 8, in block 800, a UE determines that a first scheduled UL transmission corresponding to a first communication type having a first priority overlaps with a second scheduled UL transmission corresponding to a second communication type having a second priority. The first priority is higher than the second priority. For example, the UE 115 may execute, under control of controller 280, UL transmission overlap detector 902 stored in memory 282. The execution environment of UL transmission overlap detector 902 provides the functionality to determine that a first scheduled UL transmission corresponding to a first communication type having a first priority overlaps with a second scheduled UL transmission corresponding to a second communication type having a second priority. The first priority is higher than the second priority.

In block 801, the UE multiplexes at least a portion of the first scheduled UL transmission with at least a portion of the second scheduled UL transmission to generate a third UL transmission. For example, the UE 115 may execute, under control of controller 280, UL transmission combiner 903 stored in memory 282. The execution environment of UL transmission combiner 903 provides the functionality to multiplex at least a portion of the first scheduled UL transmission with at least a portion of the second scheduled UL transmission to generate a third UL transmission.

In block 802, the UE transmits, to a base station, the third UL transmission. For example, the UE 115 may execute, under control of controller 280, UL transmission logic 904 stored in memory 282. The execution environment of UL transmission logic 904 provides the functionality to transmit the third UL transmission to a base station.

In one or more aspects, techniques for resolving UL transmission overlap may include additional aspects, such as any single aspect or any combination of aspects described below or in connection with one or more other processes or devices described elsewhere herein. In one or more aspects, supporting resolution of UL transmission overlap may include an apparatus configured to determine that a first scheduled UL transmission corresponding to a first communication type having a first priority overlaps with a second scheduled UL transmission corresponding to a second communication type having a second priority. The first priority is higher than the second priority. The apparatus may also be configured to multiplex at least a portion of the first scheduled UL transmission with at least a portion of the second scheduled UL transmission to generate a third UL transmission. The apparatus may further be configured to initiate transmission, to a base station, of the third UL transmission. In some implementations, the apparatus includes a wireless device, such as a UE. In some implementations, the apparatus may include at least one processor, and a memory coupled to the processor. The processor may be configured to perform operations described herein with respect to the apparatus In some other implementations, the apparatus may include a non-transitory computer-readable medium having program code recorded thereon and the program code may be executable by a computer for causing the computer to perform the operations described herein with reference to the apparatus. In some implementations, the apparatus may include one or more means configured to perform operations described herein. In some implementations, a method of wireless communication may include one or more operations described herein with reference to the apparatus.

In a first aspect, the first scheduled UL transmission includes an acknowledgement (ACK) on a physical uplink control channel (PUCCH), a channel state information (CSI) on the PUCCH, a multiplexing of at least two or more of a scheduling request, the ACK, and the CSI on the PUCCH, an uplink shared channel (UL-SCH) on a physical uplink shared channel (PUSCH), or a multiplexing of at least two or more of the ACK, the CSI, and the UL-SCH on the PUSCH.

In a second aspect, alone or in combination with the first aspect, the second scheduled UL transmission includes a multiplexing of at least two or more of a second scheduling request, a second CSI, and a second ACK on the PUCCH.

In a third aspect, alone or in combination with the second aspect, the apparatus bundles the second ACK into a particular number of bits and increases a priority of the bundled second ACK to the first priority.

In a fourth aspect, alone or in combination with the third aspect, the particular number of bits is indicated in one or more radio resource control (RRC) messages received from the base station.

In a fifth aspect, alone or in combination with one or more of the third through fourth aspects, the first scheduled UL transmission does not include the scheduling request, and multiplexing the at least a portion of the first scheduled UL transmission with the at least a portion of the second scheduled UL transmission includes multiplexing the second scheduling request and the bundled second ACK with the first scheduled UL transmission.

In a sixth aspect, alone or in combination with the fifth aspect, the bundled second ACK is appended to an end of a payload of the ACK of the first scheduled UL transmission and jointly encoded with the ACK, and the second scheduling request is multiplexed with the first scheduled UL transmission.

In a seventh aspect, alone or in combination with the fifth aspect, the bundled second ACK serves as the ACK of the first scheduled UL transmission, and the second scheduling request is multiplexed with the first scheduled UL transmission.

In an eighth aspect, alone or in combination of one or more of the fifth through seventh aspects, the apparatus drops the second CSI.

In a ninth aspect, alone or in combination with the third aspect, the first scheduled UL transmission includes the scheduling request, and multiplexing the at least a portion of the first scheduled UL transmission with the at least a portion of the second scheduled UL transmission includes multiplexing the bundled second ACK with the first scheduled UL transmission.

In a tenth aspect, alone or in combination with the ninth aspect, the apparatus drops the second scheduling request, the second CSI, or both.

In an eleventh aspect, alone or in combination with the third aspect, the first scheduled UL transmission includes the UL-SCH on the PUSCH, or the multiplexing of at least two or more of the ACK, the CSI, and the UL-SCH on the PUSCH, and multiplexing the at least a portion of the first scheduled UL transmission with the at least a portion of the second scheduled UL transmission includes multiplexing the bundled second ACK with the first scheduled UL transmission.

In a twelfth aspect, alone or in combination with the eleventh aspect, the apparatus drops the second scheduling request, the second CSI, or both.

In a thirteenth aspect, alone or in combination with one or more of the first through twelfth aspects, the first scheduled UL transmission includes an acknowledgement (ACK) on a physical uplink control channel (PUCCH).

In a fourteenth aspect, alone or in combination with the thirteenth aspect, the second scheduled UL transmission includes an uplink shared channel (UL-SCH) on a physical uplink shared channel (PUSCH) or a multiplexing of at least two or more of a channel state information (CSI), a second ACK, and the UL-SCH on the PUCCH.

In a fifteenth aspect, alone or in combination with the fourteenth aspect, multiplexing the at least a portion of the first scheduled UL transmission with the at least a portion of the second scheduled UL transmission includes puncturing one or more resource elements (REs) of the UL-SCH on the PUSCH of the second scheduled UL transmission with one or more REs of the ACK of the first scheduled UL transmission.

In a sixteenth aspect, alone or in combination with the fifteenth aspect, puncturing the one or more REs of the UL-SCH with the one or more REs of the ACK includes replacing the one or more REs of the UL-SCH of the UL-SCH on the PUSCH of the second scheduled UL transmission with the one or more REs of the ACK of the first scheduled UL transmission.

In a seventeenth aspect, alone or in combination with one or more of the fifteenth through sixteenth aspects, puncturing the one or more REs of the UL-SCH includes puncturing a first RE of the UL-SCH that is one orthogonal frequency division multiplexing (OFDM) symbol to the left of a last demodulation reference signal (DMRS) and puncturing a second RE of the UL-SCH that is one OFDM symbol to the right of the last DMRS.

In an eighteenth aspect, alone or in combination with the seventeenth aspect, puncturing the one or more REs of the UL-SCH further includes puncturing a third RE of the UL-SCH that is one OFDM symbol to the left of the first RE and puncturing a fourth RE of the UL-SCH that is one OFDM symbol to the right of the second RE.

In a nineteenth aspect, alone or in combination with one or more of the fifteenth through sixteenth aspects, puncturing the one or more REs of the UL-SCH includes puncturing orthogonal frequency division multiplexing (OFDM) symbols that are one OFDM symbol to the left of a last demodulation reference signal (DMRS) in each RE of the UL-SCH and puncturing OFDM symbols that are one OFDM symbol to the right of the last DMRS in each RE of the UL-SCH.

In a twentieth aspect, alone or in combination with the nineteenth aspect, puncturing the one or more REs of the UL-SCH further includes puncturing OFDM symbols that are two OFDM symbols to the left of the last DMRS in each RE of the UL-SCH and puncturing OFDM symbols that are two OFDM symbols to the right of the last DMRS in each RE of the UL-SCH.

In a twenty-first aspect, alone or in combination with one or more of the fifteenth through twentieth aspects, puncturing the one or more REs of the UL-SCH comprises refraining from puncturing a resource element (RE) of a demodulation reference signal (DMRS).

In a twenty-second aspect, alone or in combination with the twenty-first aspect, puncturing the one or more REs of the UL-SCH includes refraining from puncturing a RE of the CSI.

In a twenty-third aspect, alone or in combination with the twenty-first aspect, puncturing the one or more REs of the UL-SCH comprises puncturing one or more REs of the CSI.

In a twenty-fourth aspect, alone or in combination with one or more of the fifteenth through twenty-third aspects, the apparatus determines a number of resource elements (REs) in the ACK based on a payload size of the ACK, a beta factor corresponding to the ACK, and a modulation order corresponding to the ACK.

In a twenty-fifth aspect, alone or in combination with the twenty-fourth aspect, the beta factor is included in multiple downlink control information (DCI) grants corresponding to the first communication type.

In a twenty-sixth aspect, alone or in combination with the twenty-fourth aspect, the beta factor is included in a last downlink control information (DCI) grant corresponding to the first communication type.

In a twenty-seventh aspect, alone or in combination with the twenty-fourth aspect, the beta factor is included in a UL grant scheduling the PUSCH based on all downlink control information (DCI) grants being received before the UL grant.

In a twenty-eighth aspect, alone or in combination with one or more of the fifteenth through twenty-seventh aspects, the UL-SCH includes multiple multiple-input, multiple-output (MIMO) layers, and puncturing the one or more REs of the UL-SCH comprises puncturing only a first MIMO layer of the UL-SCH.

In a twenty-ninth aspect, alone or in combination with one or more of the fifteenth through twenty-seventh aspects, the UL-SCH includes multiple multiple-input, multiple-output (MIMO) layers, each MIMO layer of the multiple MIMO layers corresponds to a different modulation and coding scheme (MCS), and puncturing the one or more REs of the UL-SCH comprises puncturing only a MIMO layer of the UL-SCH having the highest MCS.

In a thirtieth aspect, alone or in combination with one or more of the fifteenth through twenty-seventh aspects, the UL-SCH includes multiple multiple-input, multiple-output (MIMO) layers, and puncturing the one or more REs of the UL-SCH comprises puncturing each MIMO layer of the multiple MIMO layers.

In a thirty-first aspect, alone or in combination with the thirtieth aspect, the multiple MIMO layers are punctured in a sequential order starting with a first MIMO layer.

In a thirty-second aspect, alone or in combination with one or more of the fifteenth through thirty-first aspects, the apparatus determines that a fourth scheduled UL transmission corresponding to the first communication type overlaps with a fifth scheduled UL transmission corresponding to a second communication type and determines whether to puncture one or more REs of a second UL-SCH of the fifth scheduled UL transmission with one or more REs of the fourth scheduled UL transmission based on one or more conditions.

In a thirty-third aspect, alone or in combination with the thirty-second aspect, the apparatus multiplexes at least a portion of the fourth scheduled UL transmission with at least a portion of the fifth scheduled UL transmission based on the one or more conditions not being satisfied.

In a thirty-fourth aspect, alone or in combination with one or more of the thirty-second through thirty-third aspects, the apparatus, based on the one or more conditions being satisfied, drops the fifth scheduled UL transmission and transmits the fourth scheduled UL transmission.

In a thirty-fifth aspect, alone or in combination with one or more of the thirty-second through thirty-fourth aspects, the fourth scheduled UL transmission includes a third ACK, the fifth scheduled UL transmission includes a multiplexing of a fourth ACK, a second CSI, and a second UL-SCH, and the one or more conditions include a number of REs of the third ACK exceeding a number of REs of the second UL-SCH.

In a thirty-sixth aspect, alone or in combination with one or more of the thirty-second through thirty-fifth aspects, the fourth scheduled UL transmission includes a third ACK, the fifth scheduled UL transmission includes a multiplexing of a fourth ACK, a second CSI, and a second UL-SCH, and the one or more conditions include the third ACK puncturing one or more REs of the second CSI.

In a thirty-seventh aspect, alone or in combination with one or more of the thirty-second through thirty-sixth aspects, the fourth scheduled UL transmission includes a third ACK, the fifth scheduled UL transmission includes a multiplexing of a fourth ACK, a second CSI, and a second UL-SCH, the second CSI comprises a first portion and a second portion, and the one or more conditions include a number of REs of the third ACK exceeding a number of REs of the second UL-SCH and the second portion of the second CSI.

In a thirty-eighth aspect, alone or in combination with the thirty-seventh aspect, the first portion of the second CSI includes a channel quality indicator (CQI), and the second portion of the second CSI includes precoding information, a precoding matrix indicator (PMI), reference signal received power (RSRP) information, or a combination thereof.

In a thirty-ninth aspect, alone or in combination with one or more of the thirty-second through thirty-eighth aspects, the fourth scheduled UL transmission includes a third ACK, the fifth scheduled UL transmission includes a multiplexing of a fourth ACK, a second CSI, and a second UL-SCH, and the one or more conditions include a number of REs of the third ACK exceeding a number of REs of the second UL-SCH and the second CSI.

In a fortieth aspect, alone or in combination with one or more of the thirty-second through thirty-ninth aspects, the one or more conditions include a percentage of REs being punctured in the second UL-SCH exceeding a threshold.

In a forty-first aspect, alone or in combination with the fortieth aspect, the threshold is included in a radio resource control (RRC) message received from the base station.

In a forty-second aspect, alone or in combination with one or more of the thirty-second through forty-first aspects, the one or more conditions include a number of bits in a third ACK of the fourth scheduled UL transmission exceeding a threshold.

In a forty-third aspect, alone or in combination with the forty-second aspect, the threshold is included in a radio resource control (RRC) message received from the base station.

In a forty-fourth aspect, alone or in combination with one or more of the first through forty-third aspects, the first scheduled UL transmission includes a channel state information (CSI) on a physical uplink control channel (PUCCH), a multiplexing of at least two or more of a scheduling request, an acknowledgement (ACK), and the CSI on the PUCCH, an uplink shared channel (UL-SCH) on a physical uplink shared channel (PUSCH), or a multiplexing of at least two or more of the ACK, the CSI, and the UL-SCH on the PUSCH.

In a forty-fifth aspect, alone or in combination with the forty-fourth aspect, the second scheduled UL transmission includes a multiplexing of at least two or more of a second CSI, a second ACK, and a second UL-SCH on the PUSCH.

In a forty-sixth aspect, alone or in combination with the forty-fifth aspect, multiplexing the at least a portion of the first scheduled UL transmission with the at least a portion of the second scheduled UL transmission includes dropping the second CSI and the second UL-SCH, bundling the second ACK into a particular number of bits, increasing a priority of the bundled second ACK to the first priority, and multiplexing the bundled second ACK with the first scheduled UL transmission to generate the third UL transmission.

In a forty-seventh aspect, alone or in combination with the forty-sixth aspect, the bundled second ACK is appended to an end of a payload of the ACK of the first scheduled UL transmission and jointly encoded with the ACK to generate the third UL transmission.

In a forty-eighth aspect, alone or in combination with the forty-sixth aspect, the bundled second ACK serves as the ACK of the first scheduled UL transmission.

In a forty-ninth aspect, alone or in combination with one or more of the forty-sixth through forty-eighth aspects, the particular number of bits is received in a radio resource control (RRC) message from the base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software modules which may reside on a computer-readable medium. Computer-readable media includes both computer storage media and communication media including any medium that may be enabled to transfer a computer program from one place to another. A storage media may be any available media that can be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that can be used to store desired program code in the form of instructions or data structures and that can be accessed by a computer. Also, any connection may be properly termed a computer-readable medium. Disk and disc, as used herein, includes compact disc (CD), laser disc, optical disc, digital versatile disc (DVD), hard disk, solid state disk, floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
   determining, at a user equipment (UE), that a first scheduled uplink (UL) transmission corresponding to a first communication type having a first priority overlaps with a second scheduled UL transmission corresponding to a second communication type having a second priority, wherein the first priority is higher than the second priority, the first scheduled UL transmission comprising an acknowledgement (ACK) on a physical uplink control channel (PUCCH), a channel state information (CSI) on the PUCCH, a multiplexing of the ACK and the CSI on the PUCCH, an uplink shared channel (UL-SCH) on a physical uplink shared channel (PUSCH), or a multiplexing of at least two or more of the ACK, the CSI, and the UL-SCH on the PUSCH, the first scheduled UL transmission not including a scheduling request, and the second scheduled UL transmission comprising a multiplexing of at least two or more of a second scheduling request, a second CSI, and a second ACK on the PUCCH;
   bundling the second ACK into a particular number of bits to generate a bundled second ACK having the first priority;
   multiplexing at least a portion of the first scheduled UL transmission with at least a portion of the second scheduled UL transmission to generate a third UL transmission by multiplexing the second scheduling request and the bundled second ACK with the first scheduled UL transmission; and
   transmitting, from the UE to a base station, the third UL transmission.

2. The method of claim 1, wherein the particular number of bits is indicated in one or more radio resource control (RRC) messages received from the base station.

3. The method of claim 1, wherein the bundled second ACK is appended to an end of a payload of the ACK of the first scheduled UL transmission and jointly encoded with the ACK, or serves as the ACK of the first scheduled UL transmission, and wherein the second scheduling request is multiplexed with the first scheduled UL transmission.

4. The method of claim 1, wherein the first scheduled UL transmission includes the UL-SCH on the PUSCH, or the multiplexing of at least two or more of the ACK, the CSI, and the UL-SCH on the PUSCH, and wherein multiplexing the at least a portion of the first scheduled UL transmission with the at least a portion of the second scheduled UL transmission comprises multiplexing the bundled second ACK with the first scheduled UL transmission.

5. The method of claim 1, wherein multiplexing the at least a portion of the first scheduled UL transmission with the at least a portion of the second scheduled UL transmission comprises:
   dropping the second CSI.

6. The method of claim 5, wherein the bundled second ACK is appended to an end of a payload of the ACK of the first scheduled UL transmission and jointly encoded with the ACK to generate the third UL transmission or serves as the ACK of the first scheduled UL transmission, and wherein the particular number of bits is received in a radio resource control (RRC) message from the base station.

7. An apparatus configured for wireless communication, the apparatus comprising:
   at least one processor; and
   a memory coupled to the at least one processor,
   wherein the at least one processor is configured to:
      determine, at a user equipment (UE), that a first scheduled uplink (UL) transmission corresponding to a first communication type having a first priority overlaps with a second scheduled UL transmission corresponding to a second communication type having a second priority, wherein the first priority is higher than the second priority, the first scheduled UL transmission comprising an acknowledgement (ACK) on a physical uplink control channel (PUCCH), and the second scheduled UL transmission comprising an uplink shared channel (UL-SCH) on a physical uplink shared channel (PUSCH) or a multiplexing of at least two or more of a channel state information (CSI), a second ACK, and the UL-SCH on the PUCCH, the UL-SCH including multiple multiple-input, multiple-output (MIMO) layers;
      puncture one or more resource elements (REs) of one or more MIMO layers of the UL-SCH on the PUSCH of the second scheduled UL transmission with one or more REs of the ACK of the first scheduled UL transmission to multiplex at least a portion of the first scheduled UL transmission with at least a portion of the second scheduled UL transmission to generate a third UL transmission, the one or more MIMO layers comprising only a first MIMO layer, only a MIMO layer having a highest modulation and coding scheme (MCS), or each MIMO layer of the multiple MIMO layers; and
      initiate transmission, from the UE to a base station, of the third UL transmission.

8. The apparatus of claim 7, wherein puncturing the one or more REs of the one or more MIMO layers of the UL-SCH with the one or more REs of the ACK comprises replacing the one or more REs of the one or more MIMO layers of the UL-SCH on the PUSCH of the second scheduled UL transmission with the one or more REs of the ACK of the first scheduled UL transmission.

9. The apparatus of claim 7, wherein puncturing the one or more REs of the one or more MIMO layers of the UL-SCH comprises:
- puncturing a first RE of the UL-SCH that is one orthogonal frequency division multiplexing (OFDM) symbol to the left of a last demodulation reference signal (DMRS); and
- puncturing a second RE of the UL-SCH that is one OFDM symbol to the right of the last DMRS.

10. The apparatus of claim 7, wherein puncturing the one or more REs of the one or more MIMO layers of the UL-SCH comprises:
- puncturing orthogonal frequency division multiplexing (OFDM) symbols that are one OFDM symbol to the left of a last demodulation reference signal (DMRS) in each RE of the UL-SCH; and
- puncturing OFDM symbols that are one OFDM symbol to the right of the last DMRS in each RE of the UL-SCH.

11. The apparatus of claim 7, wherein puncturing the one or more REs of the one or more MIMO layers of the UL-SCH comprises refraining from puncturing a resource element (RE) of a demodulation reference signal (DMRS).

12. The apparatus of claim 7, wherein the at least one processor is further configured to determine a number of resource elements (REs) in the ACK based on a payload size of the ACK, a beta factor corresponding to the ACK, and a modulation order corresponding to the ACK.

13. An apparatus configured for wireless communication, the apparatus comprising:
- means for determining, at a user equipment (UE), that a first scheduled uplink (UL) transmission corresponding to a first communication type having a first priority overlaps with a second scheduled UL transmission corresponding to a second communication type having a second priority, wherein the first priority is higher than the second priority, the first scheduled UL transmission comprising a multiplexing of a scheduling request and at least one of an acknowledgement (ACK) and a channel state information (CSI) on a physical uplink control channel (PUCCH), and the second scheduled UL transmission comprising a multiplexing of at least two or more of a second scheduling request, a second CSI, and a second ACK on the PUCCH;
- means for bundling the second ACK into a particular number of bits to generate a bundled second ACK having the first priority;
- means for multiplexing at least a portion of the first scheduled UL transmission with at least a portion of the second scheduled UL transmission to generate a third UL transmission by multiplexing the bundled second ACK with the first scheduled UL transmission; and
- means for transmitting, from the UE to a base station, the third UL transmission.

14. The apparatus of claim 13, wherein the particular number of bits is indicated in one or more radio resource control (RRC) messages received from the base station.

15. The apparatus of claim 13, wherein the means for multiplexing are further configured to drop the second scheduling request, the second CSI, or both.

16. The apparatus of claim 13, wherein the bundled second ACK is appended to an end of a payload of the ACK of the first scheduled UL transmission and jointly encoded with the ACK to generate the third UL transmission.

17. The apparatus of claim 13, wherein the bundled second ACK serves as the ACK of the first scheduled UL transmission.

18. A non-transitory computer-readable medium storing instructions that, when executed by a processor, cause the processor to perform operations comprising:
- determining, at a user equipment (UE), that a first scheduled uplink (UL) transmission corresponding to a first communication type having a first priority overlaps with a second scheduled UL transmission corresponding to a second communication type having a second priority, wherein the first priority is higher than the second priority, the first scheduled UL transmission comprising an acknowledgement (ACK) on a physical uplink control channel (PUCCH), and the second scheduled UL transmission comprising an uplink shared channel (UL-SCH) on a physical uplink shared channel (PUSCH) or a multiplexing of at least two or more of a channel state information (CSI), a second ACK, and the UL-SCH on the PUCCH;
- based on one or more conditions not being satisfied:
- puncturing one or more resource elements (REs) of the UL-SCH on the PUSCH of the second scheduled UL transmission with one or more REs of the ACK of the first scheduled UL transmission to multiplex at least a portion of the first scheduled UL transmission with at least a portion of the second scheduled UL transmission to generate a third UL transmission; and
- initiating transmission, from the UE to a base station, of the third UL transmission; and
- based on the one or more conditions being satisfied:
- dropping the second scheduled UL transmission; and
- initiating transmission of the first scheduled UL transmission.

19. The non-transitory computer-readable medium of claim 18, wherein the second scheduled UL transmission comprises a multiplexing of the second ACK, the CSI, and the UL-SCH, and wherein the one or more conditions comprise a number of REs of the ACK exceeding a number of REs of the UL-SCH.

20. The non-transitory computer-readable medium of claim 18, wherein the second scheduled UL transmission comprises a multiplexing of the second ACK, the CSI, and the UL-SCH, and wherein the one or more conditions comprise the ACK puncturing one or more REs of the CSI.

21. The non-transitory computer-readable medium of claim 18, wherein the second scheduled UL transmission comprises a multiplexing of the second ACK, the CSI, and the UL-SCH, wherein the CSI comprises a first portion and a second portion, wherein the one or more conditions comprise a number of REs of the ACK exceeding a number of REs of the UL-SCH and the second portion of the CSI, wherein the first portion of the CSI comprises a channel quality indicator (CQI), and wherein the second portion of the CSI comprises precoding information, a precoding matrix indicator (PMI), reference signal received power (RSRP) information, or a combination thereof.

22. The non-transitory computer-readable medium of claim 18, wherein the second scheduled UL transmission comprises a multiplexing of the second ACK, the CSI, and the UL-SCH, and wherein the one or more conditions comprise a percentage of REs being punctured in the UL-SCH exceeding a threshold, a number of bits in the ACK exceeding a second threshold, or a combination thereof.

* * * * *